United States Patent
Hayashi

(10) Patent No.: US 10,041,857 B2
(45) Date of Patent: Aug. 7, 2018

(54) METHOD OF EVALUATING CHARACTERISTICS OF OPTICAL FIBER, AND APPARATUS OF EVALUATING CHARACTERISTICS OF OPTICAL FIBER

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/726,416

(22) Filed: Oct. 6, 2017

(65) Prior Publication Data

US 2018/0100782 A1 Apr. 12, 2018

(30) Foreign Application Priority Data

Oct. 12, 2016 (JP) ................................. 2016-200976

(51) Int. Cl.
*G01M 11/00* (2006.01)

(52) U.S. Cl.
CPC .................................. *G01M 11/33* (2013.01)

(58) Field of Classification Search
CPC .... G01M 11/30; G01M 11/33; G01M 11/331; G01M 11/332; G01M 11/333; G01M 11/334; G01M 11/335; G01M 11/336; G01M 11/337
USPC ...................................................... 356/73.1
See application file for complete search history.

(56) References Cited

U.S. PATENT DOCUMENTS

| 8,432,538 B2* | 4/2013 | Nicholson | G01M 11/331 356/73.1 |
| 8,860,934 B2* | 10/2014 | Yablon | G01M 11/37 356/73.1 |
| 8,867,028 B2* | 10/2014 | Yablon | G01M 11/338 356/73.1 |

(Continued)

FOREIGN PATENT DOCUMENTS

EP 0141251 A1 * 5/1985 ............ G01M 11/33

OTHER PUBLICATIONS

J. W. Nicholson et al., "Spatially and spectrally resolved imaging of modal content in large-mode-area fibers," Optics Express, 2008, pp. 7233-7243, vol. 16, No. 10.

(Continued)

*Primary Examiner* — Gordon J Stock, Jr.
(74) *Attorney, Agent, or Firm* — Drinker Biddle & Reath LLP

(57) ABSTRACT

An optical-fiber-characteristic-evaluating apparatus includes a measuring unit and an analyzing unit. The measuring unit measures, in one arbitrary direction, dependence $F_\varphi(\varphi)$ of an electric field F of a measurement-object mode, which is one of high-order spatial modes of a multimode optical fiber that is to be evaluated, upon an angle of divergence $\varphi$ in a far field by performing FFS. The analyzing unit obtains dependence $f_r(r)$ of the electric field F of the measurement-object mode upon a fiber-radial-direction position r at the exit end of the multimode optical fiber by performing a calculation in accordance with a predetermined expression containing $F_\varphi(\varphi)$.

16 Claims, 6 Drawing Sheets

(56) References Cited

U.S. PATENT DOCUMENTS

| | | | |
|---|---|---|---|
| 9,513,189 B2* | 12/2016 | Jiang | G01M 11/33 |
| 2002/0178757 A1* | 12/2002 | Chinn | G01M 11/334 |
| | | | 65/378 |

OTHER PUBLICATIONS

Yuta Wakayama et al., "DMD Measurement of 114-SDM Transmission Fibre Using Low-Coherence Interferometry with Digital Holographic Processing," European Conference on Optical Communication (ECOC), 2015, p. 1.19.

Yongmin Jung et al., "Compact 32-Core Multicore Fibre Isolator for High-Density Spatial Division Multiplexed Transmission," ECOC, 2016, pp. 556-558, paper W.2.B.4.

Recommendation G.650.2, "Definitions and test methods for statistical and non-linear related attributes of single-mode fibre and cable," Telecommunication Standardization Sector of International Telecommunication Union (ITU-T), 2015.

* cited by examiner

METHOD OF EVALUATING CHARACTERISTICS OF OPTICAL FIBER, AND APPARATUS OF EVALUATING CHARACTERISTICS OF OPTICAL FIBER

BACKGROUND OF THE INVENTION

Field of the Invention

The present invention relates to a method and an apparatus of evaluating optical characteristics of each of spatial modes propagating through a multimode optical fiber.

Description of the Related Art

J. W. Nicholson et al., "Spatially and spectrally resolved imaging of modal content in large-mode-area fibers," Optics Express 16(10), 7233-7243 (2008) and Y. Wakayama et al., "DMD measurement of 114-SDM transmission fibre using low-coherence interferometry with digital holographic processing," European Conference on Optical Communication (ECOC) (2015), P. 1.19 describe a method which obtain near-field patterns (NFPs) of the respective spatial modes propagating through a multimode optical fiber. In the method, the NFP of a plurality of spatial modes propagating through the multimode optical fiber is measured through a magnification optical system and an infrared camera and the interference observed in the result of the measurement is analyzed.

Y. Jung et al., "Compact 32-Core Multicore Fibre Isolator for High-Density Spatial Division Multiplexed Transmission," ECOC (2016), pp. 556-558, paper W.2.B.4 describes a method in which the entrance end surface of a receiving optical fiber is two-dimensionally scanned through a magnification optical system, whereby two-dimensional NFPs of a multimode optical fiber are measured with a high dynamic range.

Recommendation G.650.2, "Definitions and test methods for statistical and non-linear related attributes of single-mode fibre and cable," Telecommunication Standardization Sector of International Telecommunication Union (ITU-T) (2015) describes a method which measures the mode field diameter (MFD) and the effective cross-sectional area (Aeff) by far-field scanning (FFS) and evaluates them. In this method, a one-dimensional far-field pattern (FFP) of a circularly symmetric fundamental mode is measured with the angle of divergence taken as the horizontal axis, and the result is numerically converted by zeroth-order inverse Hankel transform into a one-dimensional NFP with the position in the radial direction of the fiber taken as the horizontal axis. Then, the MFD and the Aeff are calculated from the NFP.

In each of the methods disclosed by J. W. Nicholson et al., Y. Wakayama et al., and Y. Jung et al., a magnification optical system is used. Therefore, the diffraction limit of the magnification optical system makes the spatial resolution of the analyzed NFP lower than the spatial resolution of the actual NFP. In each of the methods disclosed by J. W. Nicholson et al. and Y. Wakayama et al., an infrared camera is used. However, the infrared camera only has a dynamic range of about 40 dB at highest. Moreover, the dynamic range is lowered at the time of analysis for mode separation. In the method disclosed by Y. Jung et al., since the image is obtained by two-dimensionally scanning the entrance end surface of the receiving optical fiber, it takes a very long time to take one image. The conversion of an FFP into an NFP disclosed by ITU-T in Recommendation G.650.2 is applicable only to a circularly symmetric mode (a mode having an azimuthal mode number of 0). In a high-order spatial mode having an azimuthal mode number of 1 or greater, the mode is no longer circularly symmetric and when the azimuth changes, the phase and the polarization also change. Consequently, the mode is converted with errors.

SUMMARY OF THE INVENTION

The present invention provides a method and an apparatus of evaluating optical characteristics of a multimode optical fiber (MMF) having one or more high-order spatial modes each of whose azimuthal mode number n is not 0. The evaluation is made for each of the spatial modes with a high dynamic range and a high spatial resolution and in a short time.

According to an aspect of the present invention, there is provided a method of evaluating optical characteristics of each of one or more high-order spatial modes propagating through an MMF, the spatial modes each having an azimuthal mode number n that is not 0. The method includes a measurement step in which dependence $F_\varphi(\varphi)$ of an electric field F of a measurement-object mode, which is one of the high-order spatial modes, upon an angle of divergence $\varphi$ in a far field is measured in one arbitrary direction by far-field scanning; and an analysis step in which dependence $f_r(r)$ of the electric field F of the measurement-object mode upon a fiber-radial-direction position r at an exit end of the MMF is calculated in accordance with Expression (1):

$$f_r(r) = \int_0^{\varphi_{max}} F_\varphi(\varphi) J_n(rk \sin \varphi)) \sin 2\varphi \, d\varphi \quad (1)$$

containing the dependence $F_\varphi(\varphi)$, where k denotes a wave number of light in a vacuum, and $\varphi_{max}$ denotes a maximum angle of divergence in the measurement of the dependence $F\varphi(\varphi)$ or a maximum angle of divergence at which the measured dependence $F_\varphi(\varphi)$ is significant.

According to another aspect of the present invention, there is provided an apparatus of evaluating optical characteristics of each of one or more high-order spatial modes propagating through an MMF, the spatial modes each having an azimuthal mode number n that is not 0. The apparatus includes a measuring unit that measures, in one arbitrary direction, dependence $F_\varphi(\varphi)$ of an electric field F of a measurement-object mode, which is one of the high-order spatial modes, upon an angle of divergence $\varphi$ in a far field by far-field scanning; and an analyzing unit that calculates dependence $f_r(r)$ of the electric field F of the measurement-object mode upon a fiber-radial-direction position r at an exit end of the MMF in accordance with Expression (1) above containing the dependence $F_\varphi(\varphi)$.

According to each of the above aspects of the present invention, optical characteristics of an MMF having one or more high-order spatial modes each of whose azimuthal mode number n is not 0 can be evaluated for each of the spatial modes with a high dynamic range and a high spatial resolution and in a short time.

DESCRIPTION OF THE PREFERRED EMBODIMENTS

Figure 1:
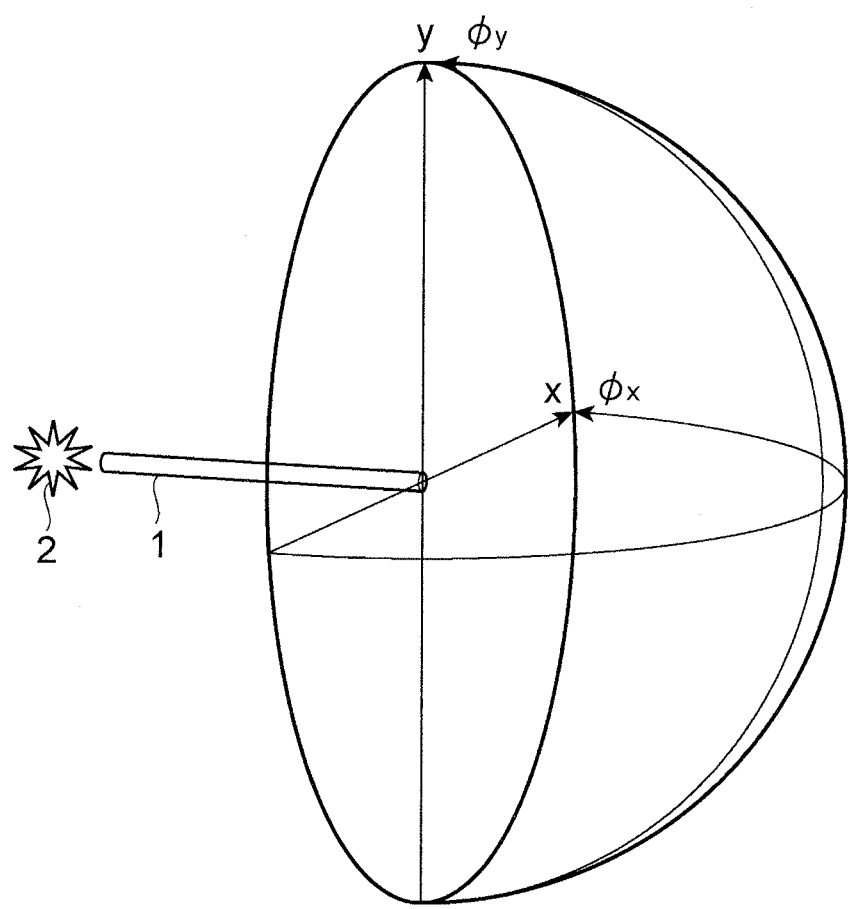
FIG. 1 illustrates a Cartesian coordinate system (x, y) and angles of divergence $\varphi_x$ and $\varphi_y$.

An embodiment of the present invention will now be described in detail with reference to the accompanying drawings, wherein identical reference numerals denote the same elements. Redundant description of the same elements is omitted. The present invention is not limited to the following exemplary embodiment. The scope of the present invention is defined by the appended claims and encompasses any equivalents thereof and any modifications made thereto within the scope.

Space division multiplexing (SDM) is a promising technique that can overcome the current limit imposed on the transmission capacity of a single-mode fiber (SMF). Major SDM techniques include mode division multiplexing in which a few-mode fiber (FMF) or a few-mode multi-core fiber (FM-MCF) is employed.

To evaluate or estimate transmission characteristics of an optical fiber, characteristics of individual modes need to be identified. However, in many research reports on FMFs or FM-MCFs, the effective cross-sectional area (Aeff) of a high-order spatial mode is not actually measured. Instead, a value calculated from a near-field pattern (NFP) estimated from a relevant calculation is reported, because it is difficult to measure the NFP of a high-order mode in a two-dimensional way and with a high dynamic range.

Regarding the mode of a SMF, the Aeff is measured by far-field scanning (FFS). In such a measurement method, the Aeff is correctly measurable by using an NFP obtained through the conversion of a far-field pattern (FFP) that is measurable with a high spatial resolution and a high dynamic range. However, Hankel transform employed in the conversion of an NFP into an FFP is applicable only to a circularly symmetric mode and is not applicable to non-circularly symmetric high-order modes propagating through a FMF. Although a two-dimensional NFP is directly measurable by S2 imaging, a low-coherence interferometry, or the like, such a method accompanies difficulties in correctly measuring the Aeff because of the dynamic-range limit of the infrared camera or the spatial-resolution limit imposed by the diffraction limit of the magnification optical system.

A method of evaluating characteristics of an optical fiber and an apparatus of evaluating characteristics of an optical fiber according to the following embodiment each enable an evaluation of optical characteristics of each of spatial modes propagating through an FMF with a high dynamic range and a high spatial resolution and in a short time. In the embodiment, Hankel transform of an NFP of a non-circularly symmetric high-order mode propagating through a cylindrically symmetric core into an FFP is employed, and FFPs of non-circularly symmetric high-order modes propagating through a four-linearly-polarized-mode (4LP-mode) fiber are measured by FFS, which realizes a high dynamic range. From the FFPs thus measured, NFPs and Aeffs of the respective non-circularly symmetric high-order modes are calculated. The result of such a calculation closely matches with the estimation based on two-dimensional FT.

In FFS performed on a circularly symmetric fundamental mode of a cylindrically symmetric core, an NFP is obtained by numerically converting a measured FFP. If the electric-field distribution of the mode is circularly symmetric, the NFP ($f_r(r)$) and the FFP ($F_\varphi(\varphi)$) are convertible into each other in accordance with the following zeroth-order Hankel transform pair:

$$\begin{cases} F_\varphi(\varphi) \propto 2\pi \int_0^\infty f_r(r) J_0(rk\sin\varphi) r dr \\ f_r(r) \propto \int_0^{\pi/2} F_\varphi(\varphi) J_0(rk\sin\varphi) \sin 2\varphi d\varphi \end{cases} \quad (2)$$

In Expression (2) above, r denotes the radial-direction position in the NFP plane (the fiber end surface), $\varphi$ denotes the angle of divergence [rad] spreading toward the FFP, $J_0$ denotes the zeroth-order Bessel function of the first kind, and $k=2\pi/\lambda$ denotes the wave number of light in a vacuum. Since the conversion is realized in accordance with the above relational expression, the NFP can be estimated with a high dynamic range and a high spatial resolution. Consequently, the Aeff can be measured correctly.

In general, the Fraunhofer diffraction pattern of an NFP f (i.e., an FFP F) is expressed as follows:

$$F(\varphi_x, \varphi_y) \propto \iint f(x,y) \exp[-jk(x\sin\varphi_x + y\sin\varphi_y)] dx dy, \quad (3)$$

where (x, y) denotes the local Cartesian coordinates at the fiber end surface, $\varphi_x$ denotes the angle of divergence spreading toward the FFP in the x-axis direction, and $\varphi_y$ denotes the angle of divergence spreading toward the FFP in the y-axis direction.

FIG. 1 illustrates a Cartesian coordinate system (x, y) and the angles of divergence $\varphi_x$ and $\varphi_y$. Light emitted from a light source 2 enters the entrance end of a multimode optical fiber (MMF) 1, which is the object of evaluation. The light is guided through the MMF 1 and emerges from the exit end of the MMF 1. The Cartesian coordinate system (x, y) having the origin thereof coinciding with the center of the MMF 1 extends in a plane containing the exit end surface of the MMF 1.

Expression (3) given above is also expressed as follows:

$$F_{FT}(p_x, p_y) \propto \iint f(x,y) \exp[-j(p_x x + p_y y)] dx dy. \quad (4)$$

[$\because p_x = (2\pi/\lambda)\sin\varphi_x, p_y = (2\pi/\lambda)\sin\varphi_y$]

That is, Expression (3) is regarded as a two-dimensional Fourier transform (FT). Furthermore, Expression (4) is also expressed as the following polar coordinate system:

$$F_{FT,polar}(\rho, \Theta) \propto \int_0^\infty \int_0^{2\pi} f_{polar}(r, \theta) \exp[-j\rho r \cos(\Theta - \theta)] d\theta r dr, \quad (5)$$

where (r, θ) denotes the polar coordinate system corresponding to (x, y), and (ρ, Θ) is the polar coordinate system corresponding to ($p_x$, $p_y$). In addition, ρ is also expressed with respect to the angle of divergence $\varphi$ as $\rho=(2\pi/\lambda)\sin\varphi$.

In the case of the circularly symmetric mode, the two-dimensional FT is equal to the zeroth-order Hankel transform. Hence, the NFP and the FFP of the fundamental mode are convertible into each other in accordance with Expression (2). However, a high-order mode in which the azimuthal mode number n is not 0 has an electric-field distribution that is not circularly symmetric.

Figure 2:
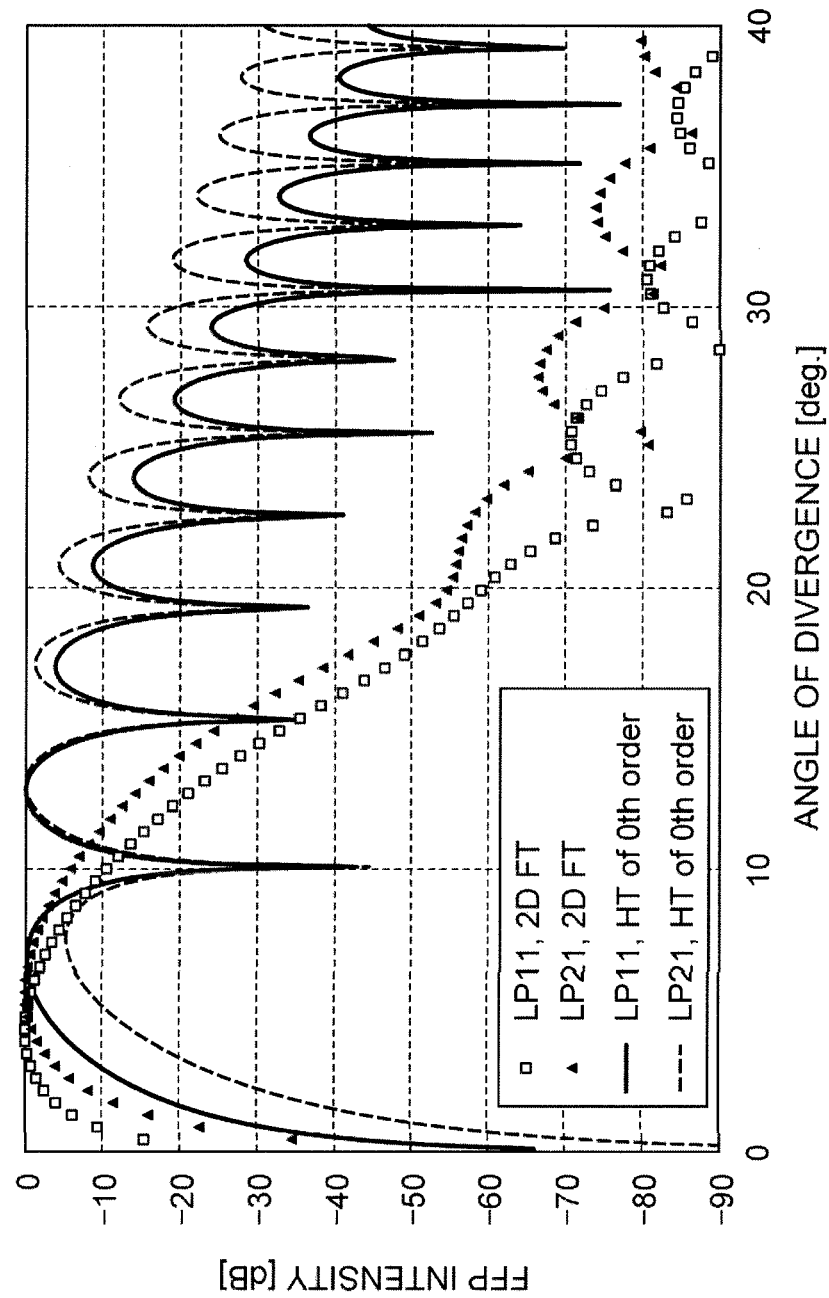
FIG. 2 is a diagram in which far-field patterns (FFPs) obtained by two-dimensional Fourier transform (FT) of near-field patterns (NFPs) of an LP11 mode and an LP21 mode, respectively, propagating through a four-linearly-polarized-mode (4LP-mode) core are compared with FFPs obtained by zeroth-order Hankel transform of the same NFPs in accordance with Expression (2).

FIG. 2 is a diagram in which FFPs obtained by two-dimensional FT of NFPs of an LP11 mode and an LP21 mode, respectively, propagating through a 4LP-mode core (supposed to have a core diameter of 17.6 μm, a relative refractive-index difference Δ of the core with respect to the cladding of 1.09%, and a profile parameter a of the refractive-index profile of 1.9) are compared with FFPs obtained by zeroth-order Hankel transform of the same NFPs in accordance with Expression (5). In FIG. 2, the FFP intensity is standardized by defining the maximum value as 0 dB. The result of the two-dimensional FT, which is supposed to correspond to the actual FFP, and the result of the zeroth-order Hankel transform are totally different from each other for both the LP11 mode and the LP21 mode. Zeroth-order Hankel transform is not applicable to the NFP-FFP conversion of a non-circularly symmetric mode. To address this problem, the present embodiment employs the following transform method.

In the case of the LP mode (LPnm mode), $f_{polar}$ on the right side of Expression (5) is expressed as $f_r(r)\cos(n\theta)$ or $f_r(r)\sin(n\theta)$. The subscript "polar" means that the function takes the polar coordinates as variables. On the basis of this definition, it is assumed that $f_{polar}$ can be solved by separation of variables into $f_r(r)f_\theta(\theta)$. Then, the following Hankel transform pairs generalized for an LP mode having an azimuthal mode number n are obtained:

If $f_{polar}=f_r(r)\cos(n\theta)$, the following applies:

$$\begin{cases} F_{polar}(\varphi, \Theta) \propto F_\varphi(\varphi)\cos(n\Theta) \\ f_{polar}(r, \theta) \propto f_r(\varphi)\cos(n\theta) \end{cases}$$

If $f_{polar}=f_r(r)\sin(n\theta)$, the following applies:

$$\begin{cases} F_{polar}(\varphi, \Theta) \propto F_\varphi(\varphi)\sin(n\Theta) \\ f_{polar}(r, \theta) \propto f_r(\varphi)\sin(n\theta) \end{cases} \quad (6)$$

Furthermore, the following is obtained:

$$\begin{cases} F_\varphi(\varphi) = H_n[f_r](\varphi) = \int_0^\infty f_r(r)J_n(rk\sin\varphi)rdr \\ f_r(r) = H_N^{-1}[F_\varphi](r) = \int_0^{\pi/2} F_\varphi(\varphi)J_n(rk\sin\varphi)\sin 2\varphi d\varphi \end{cases} \quad (7)$$

Expressions (6) and (7) given above show the following facts:
(a) Among the above expressions, those related to $f_{polar}=f_r(r)\cos(n\theta)$ match with Expression (2) if n=0.
(b) According to Expression (6), the absolute level of the radial profile of the FFP (corresponding to $\cos(n\Theta)$ or $\sin(n\Theta)$ in Expression (6)) depends on the angle Θ, whereas the geometry of the radial profile of the FFP (corresponding to $F_\varphi(\varphi)=H_n[f_r](\varphi)$ in Expression (7)) does not depend on the angle Θ. That is, regardless of the direction of scanning performed in the measurement of the FFP, the profile geometry $F_\varphi(\varphi)$ does not change during the measurement, although the absolute level of the profile changes. Hence, Expression (7) only needs to be considered, normally.
(c) An even mode in which the electric-field amplitude of the NFP in the azimuthal direction changes with cos(nθ) is converted into an even mode in which the electric-field amplitude of the FFP changes with cos(nΘ). In contrast, an odd mode in which the electric-field amplitude of the NFP in the azimuthal direction changes with sin(nθ) is converted into an odd mode in which the electric-field amplitude of the FFP changes with sin(nΘ).

Figure 3:
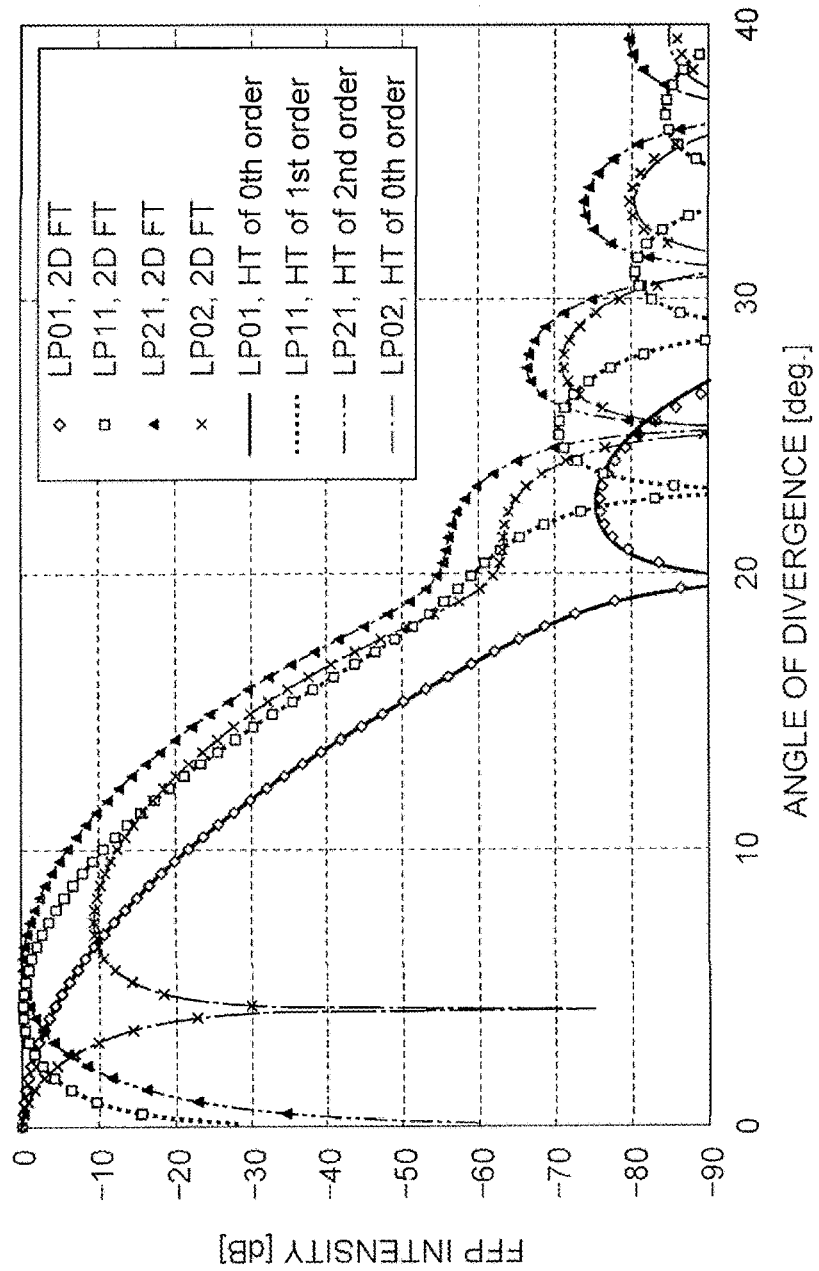
FIG. 3 is a diagram in which FFPs obtained by two-dimensional FT of NFPs of an LP01 mode (n=0), an LP11 even mode (n=1), an LP21 even mode (n=2), and an LP02 mode (n=0), respectively, propagating through a 4LP-mode core are compared with FFPs obtained by generalized Hankel transform of the same NFPs in accordance with Expression (7) with appropriate n values.

A calculation for checking the validity of Expression (7) was conducted. FIG. 3 is a diagram in which FFPs obtained by two-dimensional FT of NFPs of an LP01 mode (n=0), an LP11 even mode (n=1), an LP21 even mode (n=2), and an LP02 mode (n=0), respectively, propagating through a 4LP-mode core are compared with FFPs obtained by generalized Hankel transform of the same NFPs in accordance with Expression (7) with appropriate n values. The 4LP-mode core is assumed to be the same as that used for the comparison illustrated in FIG. 2. In FIG. 3 also, the FFP intensity is standardized by defining the maximum value as 0 dB. The FFPs obtained by two-dimensional FT closely match with the FFPs obtained by the generalized Hankel transform, which is given above as Expression (7), for all of the modes. This proves that the NFP-FFP conversion of a high-order mode whose azimuthal mode number n is not 0 is valid in accordance with Expression (7).

The x- and y-polarization components $\{f_x, f_y\}$ of an NFP of an eigenmode that is characteristic of a cylindrically symmetric core are expressed as $\{f_r\cos(n\theta), \pm f_r\sin(n\theta)\}$ or $\{\pm f_r\sin(n\theta), f_r\cos(n\theta)\}$. Considering this expression and the above facts (b) and (c), the x- and y-polarization components $\{F_x, F_y\}$ of an FFP of the eigenmode that is characteristic of the cylindrically symmetric core are expressed as $\{H_n[f_r]\cos(n\Theta), \pm H_n[f_r]\sin(n\Theta)\}$ or $\{\pm H_n[f_r]\sin(n\Theta), H_n[f_r]\cos(n\Theta)\}$.

Hence, the intensity distribution of the NFP of the eigenmode that is characteristic of the cylindrically symmetric core is expressed as follows:

$$|f(r, \theta)|^2 = |f_x(r, \theta)|^2 + |f_y(r, \theta)|^2 \quad (8)$$
$$= |f_r(r)|^2(\cos^2 n\theta + \sin^2 n\theta)$$
$$= |f_r(r)|^2.$$

Furthermore, the intensity distribution of the FFP of the eigenmode that is characteristic of the cylindrically symmetric core is expressed as follows:

$$|F(\rho, \Theta)|^2 = |F_x(r, \Theta)|^2 + |F_y(\rho, \Theta)|^2 \quad (9)$$
$$= |F_\rho(\rho)|^2(\cos^2 n\Theta + \sin^2 n\Theta)$$
$$= |F_\rho(\rho)|^2.$$

This shows that even if a high-order mode of a cylindrically symmetric core has a non-circularly symmetric phase component, the mode has a circularly symmetric intensity component.

Here, using $|f_r(r)|^2$ and $|F_\varphi(\varphi)|^2$, the mode field diameter (MFD) of the eigenmode is calculable in accordance with a known expression. Specifically, the MFD defined by the second moment of the NFP (denoted as MFD1, i.e., the MFD of a so-called Petermann I) is calculated as follows:

$$MFD1 = 2\left[2\frac{\left(\int |f_r(r)|^2 r^3 dr\right)^2}{\int |f_r(r)|^2 r dr}\right]^{1/2}. \quad (10)$$

Furthermore, the MFD defined by the second moment of the FFP (the MFD of a so-called Petermann II) is calculated as follows:

$$MFD = \frac{\lambda}{\pi}\left[2\frac{\int_0^{\pi/2}|F_\varphi(\varphi)|^2 \sin\varphi\cos\varphi d\varphi}{\int_0^{\pi/2}|F_\varphi(\varphi)|^2 \sin^3\varphi\cos\varphi d\varphi}\right]^{1/2}. \quad (11)$$

As described above in the fact (b), $|f_r(r)|^2$ only needs to be calculated in accordance with Expression (5), regardless of the direction of scanning of the FFP in the measurement of $|F_\varphi(\varphi)|^2$ (regardless of in which azimuthal direction Θ the scanning is performed).

The effective cross-sectional area Aeff is defined as follows:

$$A_{eff} = \frac{\left(\iint |f|^2 dxdy\right)^2}{\iint |f|^4 dxdy} = \frac{\left(\int_0^\infty \int_0^{2\pi}|f|^2 d\theta dr\right)^2}{\int_0^\infty \int_0^{2\pi}|f|^4 d\theta dr}. \quad (12)$$

Hence, the Aeff of the eigenmode is calculated as follows:

$$A_{eff,EM} = \frac{\left(\int_0^\infty |f_r|^2 dr \int_0^{2\pi} d\theta\right)^2}{\int_0^\infty |f_r|^4 dr \int_0^{2\pi} d\theta} = 2\pi \frac{\left(\int_0^\infty |f_r(r)|^2 rdr\right)^2}{\int_0^\infty |f_r(r)|^4 rdr}. \quad (13)$$

The Aeff of an LP mode (i.e., the x-polarization component or the y-polarization component of the eigenmode) is calculated as follows:

$$A_{eff,LP} = \frac{\left(\int_0^\infty |f_r|^4 dr \int_0^{2\pi} \cos^2 n\theta d\theta\right)^2}{\int_0^\infty |f_r|^4 dr \int_0^{2\pi} \cos^4 n\theta d\theta} \quad (14)$$

$$= \frac{\left(\pi \int_0^\infty |f_r|^2 rdr\right)^2}{\frac{3\pi}{4}\int_0^\infty |f_r|^4 rdr} = \frac{4\pi}{3}\frac{\left(\int_0^\infty |f_r|^2 rdr\right)^2}{\int_0^\infty |f_r|^4 rdr}$$

$$= \frac{2}{3}A_{eff,EM}.$$

While the above expressions apply to the case of an even mode, the same apply to the case of an odd mode.

Figure 4:
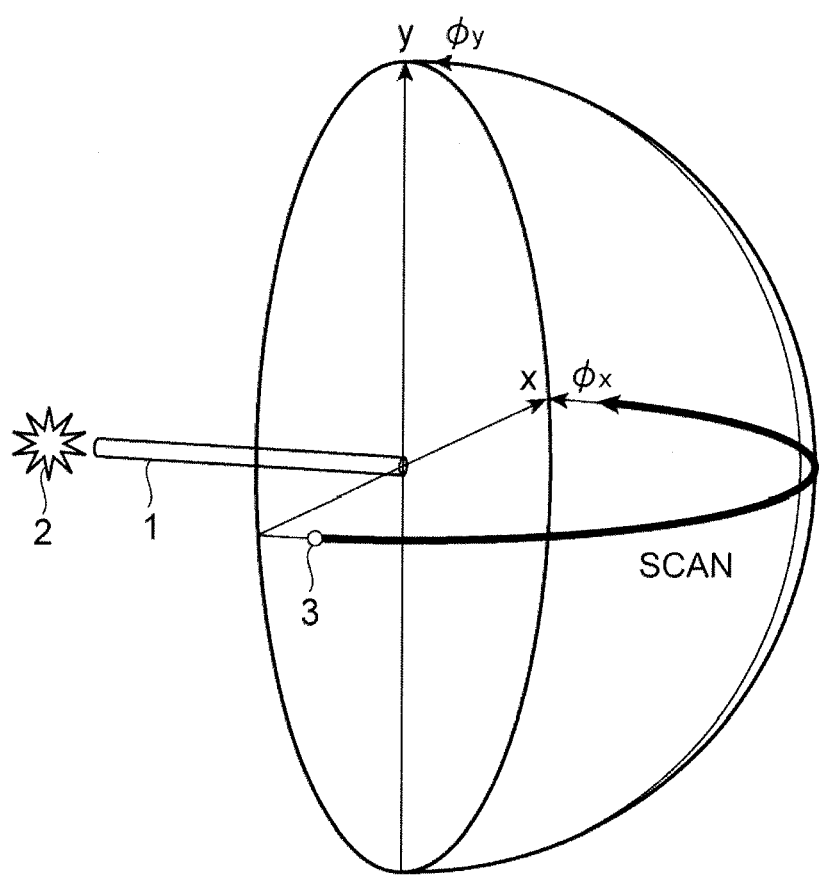
FIG. 4 illustrates FFP scanning performed in the measurement of $|F_\varphi(\varphi)|^2$.

FIG. 4 illustrates the FFP scanning performed in the measurement of $|F_\varphi(\varphi)|^2$. FIG. 4 is obtained by adding a detector 3 to the elements illustrated in FIG. 1 and illustrates the direction of scanning performed by the detector 3, which serves as a light-intensity-measuring device. The detector 3 according to the present embodiment only needs to be capable of performing scanning in one arbitrary direction. The detector 3 may be replaced with a detector that scans the entrance end of the optical fiber to be measured. In that case, the detector is optically connected to the exit end of the optical fiber.

Figure 5:
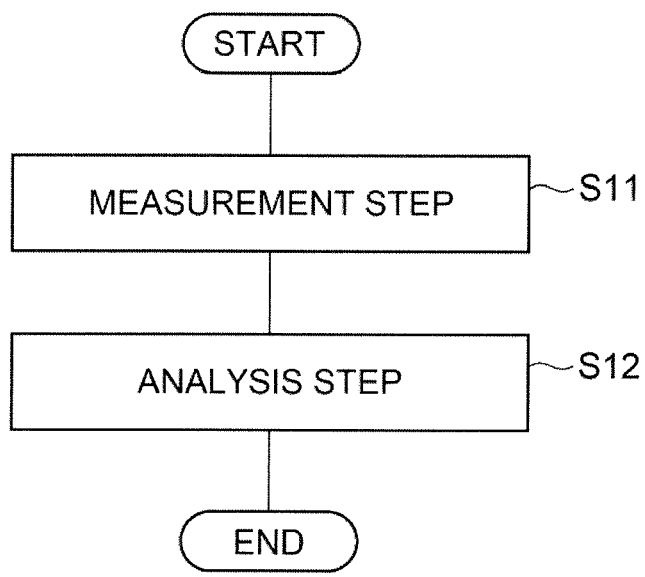
FIG. 5 is a flow chart illustrating a method of evaluating characteristics of an optical fiber according to an embodiment.
Figure 6:
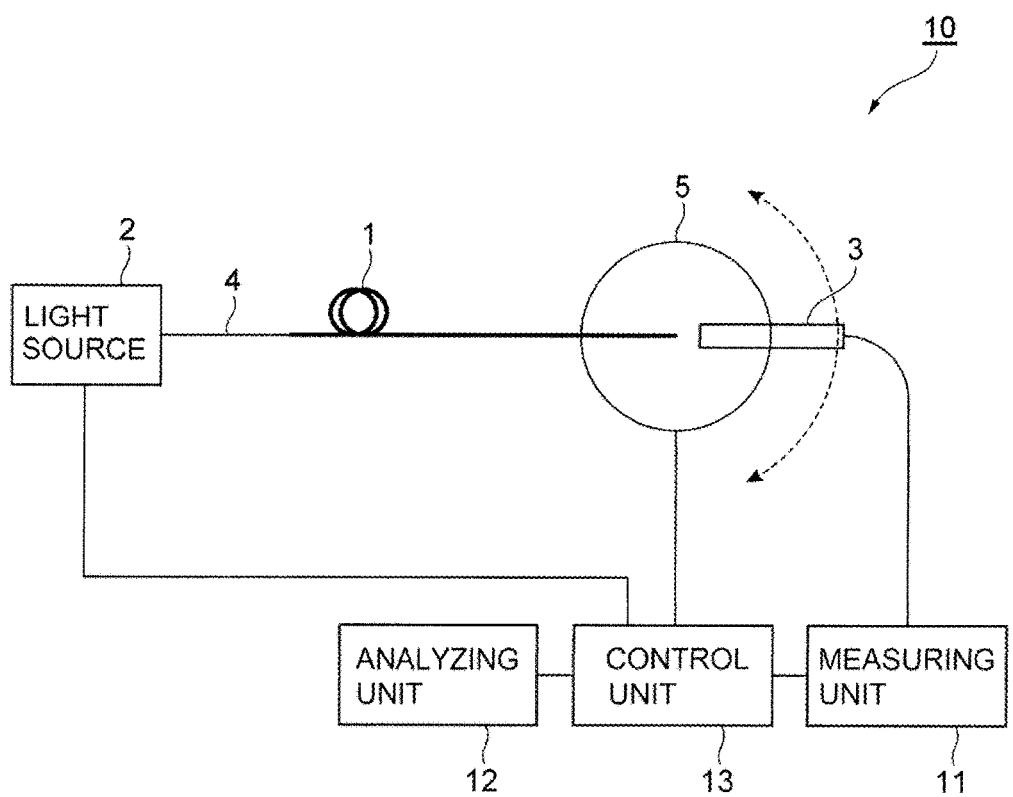
FIG. 6 is a conceptual diagram of an optical-fiber-characteristic-evaluating apparatus according to the embodiment.

FIG. 5 is a flow chart illustrating a method of evaluating characteristics of an optical fiber according to the present embodiment. The method of evaluating characteristics of an optical fiber according to the present embodiment includes a measurement step S11 and an analysis step S12. FIG. 6 is a conceptual diagram of an optical-fiber-characteristic-evaluating apparatus 10 according to the present embodiment. The optical-fiber-characteristic-evaluating apparatus 10 includes a measuring unit 11, an analyzing unit 12, and a control unit 13. The measuring unit 11 may include a photo detector or a power meter and the analyzing unit may include a computer.

The MMF 1, which is an optical fiber to be measured, is preferably coiled in a part thereof with a predetermined diameter so that any cladding modes are removed. The light source 2 is preferably a laser light source. Light emitted from the light source 2 is guided by an entrance fiber 4 and is incident on the entrance end of the MMF 1 as the optical fiber to be measured. A rotatable stage 5 is rotatable about the exit end of the MMF 1. The entrance end of a receiving optical fiber serving as the detector 3 is fixed to the rotatable stage 5. With the rotation of the rotatable stage 5, the entrance end of the receiving optical fiber is scanned. The light that is incident on the entrance end of the receiving optical fiber is guided to the measuring unit 11. The receiving optical fiber may be either an MMF or an SMF.

In the measurement step S11, the measuring unit 11 measures, in one arbitrary direction, dependence $F_\varphi(\varphi)$ of an electric field F of a measurement-object mode upon an angle of divergence φ in a far field by performing FFS. The measurement-object mode is one of high-order spatial modes of the MMF 1, which is the object of evaluation. This measurement is performed by using the optical system illustrated in FIG. 4. The MMF 1 as the object of evaluation may have a rotationally symmetric core or a cylindrically symmetric core.

In the measurement step S11, the dependence $F_\varphi(\varphi)$ of the electric field F of the measurement-object mode upon the angle of divergence φ in the far field may be measured in the following alternative method. Specifically, the measuring unit 11 measures dependence $|F_\varphi(\varphi)|^2$ of the light intensity of the measurement-object mode upon the angle of divergence φ in the far field by using the light-intensity-measuring device, and then takes the square root of the light intensity, thereby obtaining an absolute value $|F_\varphi(\varphi)|$ of the electric field F. Then, the sign of the electric field F is inverted at an angle of divergence φ where the light intensity is lowest regardless of measurement noise.

In the measurement step S11, the measuring unit 11 may selectively measure the light of the measurement-object mode by selectively allowing the light to enter the measurement-object mode of the MMF 1 through a selective mode multiplexer. Alternatively, in the measurement step S11, the measuring unit 11 may selectively measure the light of the measurement-object mode by analyzing the interference between the fundamental mode and the measurement-object mode and extracting the component of the measurement-object mode.

In the analysis step S12, the analyzing unit 12 performs a predetermined analysis on the basis of the result of the measurement performed by the measuring unit 11. Specifically, in the analysis step S12, the analyzing unit 12 obtains dependence $f_r(r)$ of the electric field F of the measurement-object mode upon a fiber-radial-direction position r at the exit end of the MMF 1 by performing a calculation in accordance with Expression (1) containing $F_\varphi(\varphi)$.

In the analysis step S12, the analyzing unit 12 may evaluate the Aeff of the measurement-object mode by performing a calculation in accordance with Expression (13) containing $f_r(r)$. Alternatively, in the analysis step S12, the analyzing unit 12 may evaluate the MFD1 defined by the second moment of the NFP of the measurement-object mode by performing a calculation in accordance with Expression (10) containing $f_r(r)$. Alternatively, in the analysis step S12, the analyzing unit 12 may evaluate the MFD defined by the second moment of the FFP of the measurement-object mode by performing a calculation in accordance with Expression (11) containing the dependence $|F_\varphi(\varphi)|^2$ of the light intensity of the measurement-object mode upon the angle of divergence $\varphi$ in the far field.

The receiving optical fiber serving as the detector 3 may be replaced with a photodiode or the like provided at a position corresponding to the entrance end of the receiving optical fiber. A selective mode multiplexer may be provided between the entrance fiber 4 and the MMF 1, whereby the light is allowed to be incident only on the measurement-object mode of the MMF 1. Alternatively, the entrance fiber 4 and the MMF 1 may be directly coupled to each other without interposing the mode multiplexer therebetween. In such a configuration, the analyzing unit 12 analyzes the interference between a non-measurement-object mode and the measurement-object mode, and the component of the measurement-object mode is extracted. The non-measurement-object mode is preferably the fundamental mode.

What is claimed is:

1. A method of evaluating optical characteristics of each of one or more high-order spatial modes propagating through a multimode optical fiber, the spatial modes each having an azimuthal mode number n that is not 0, the method comprising:
   a measurement step including measuring dependence $F_\varphi(\varphi)$ of an electric field F of a measurement-object mode, which is one of the high-order spatial modes, upon an angle of divergence $\varphi$ in a far field in one arbitrary direction by far-field scanning; and
   an analysis step including calculating dependence $f_r(r)$ of an electric field f of the measurement-object mode upon a fiber-radial-direction position r at an exit end of the multimode optical fiber in accordance with Expression (1):

$$f_r(r) = \int_0^{\varphi_{max}} F_\varphi(\varphi) J_n(rk \sin \varphi) \sin 2\varphi d\varphi, \quad (1)$$

where k denotes a wave number of light in a vacuum, and $\varphi_{max}$ denotes a maximum angle of divergence in the measurement of the dependence $F_\varphi(\varphi)$ or a maximum angle of divergence at which the measured dependence $F_\varphi(\varphi)$ is significant.

2. The method according to claim 1,
   wherein, the analysis step including evaluating an effective cross-sectional area Aeff of the measurement-object mode by performing a calculation in accordance with Expression (2):

$$A_{eff} = 2\pi \frac{\left(\int_0^\infty |f_r(r)|^2 r dr\right)^2}{\int_0^\infty |f_r(r)|^4 r dr}. \quad (2)$$

3. The method according to claim 1,
   wherein, the analysis step including evaluating a mode field diameter MFD defined by a second moment of a near-field pattern of the measurement-object mode by performing a calculation in accordance with Expression (3):

$$MFD = 2\left[2 \frac{\left(\int |f_r(r)|^2 r^3 dr\right)^2}{\int |f_r(r)|^2 r dr}\right]^{1/2}. \quad (3)$$

4. The method according to claim 1,
   wherein, the analysis step including evaluating a mode field diameter MFD defined by a second moment of a far-field pattern of the measurement-object mode by performing a calculation in accordance with Expression (4):

$$MFD = \frac{\lambda}{\pi}\left[2 \frac{\int_0^{\pi/2} |F_\varphi(\varphi)|^2 \sin\varphi\cos\varphi d\varphi}{\int_0^{\pi/2} |F_\varphi(\varphi)|^2 \sin^3\varphi\cos\varphi d\varphi}\right]^{1/2}. \quad (4)$$

5. The method according to claim 1,
   wherein, the measurement step including measuring the dependence $F_\varphi(\varphi)$ by measuring, with a light-intensity-measuring device, dependence $|F_\varphi(\varphi)|^2$ of light intensity of the measurement-object mode upon the angle of divergence $\varphi$ in the far field, taking a square root of the light intensity so as to convert the dependence $|F_\varphi(\varphi)|^2$ into an absolute value $|F_\varphi(\varphi)|$ of the electric field F, and inverting a sign of the electric field F at an angle of divergence $\varphi$ where the light intensity is lowest regardless of measurement noise.

6. The method according to claim 1,
   wherein, the measurement step including measuring light of the measurement-object mode selectively by selectively allowing the light to enter the measurement-object mode of the multimode optical fiber through a selective mode multiplexer.

7. The method according to claim 1,
   wherein, the measurement step including measuring light of the measurement-object mode selectively by analyzing interference between a non-measurement-object mode and the measurement-object mode and extracting a component of the measurement-object mode.

8. The method according to claim 1,
   wherein the multimode optical fiber has a rotationally symmetric core.

9. The method according to claim 1,
   wherein the multimode optical fiber has a cylindrically symmetric core.

10. An apparatus of evaluating optical characteristics of each of one or more high-order spatial modes propagating through a multimode optical fiber, the spatial modes each having an azimuthal mode number n that is not 0, the apparatus comprising:
    a measuring unit configured to measure, in one arbitrary direction, dependence $F_\varphi(\varphi)$ of an electric field F of a measurement-object mode, which is one of the high-order spatial modes, upon an angle of divergence $\varphi$ in a far field by far-field scanning; and an analyzing unit configured to calculate dependence $f_r(r)$ of an electric field f of the measurement-object mode upon a fiber-radial-direction position r at an exit end of the multimode optical fiber in accordance with Expression (5):

$$f_r(r) = \int_0^{\varphi_{max}} F_\varphi(\varphi) J_n(rk \sin \varphi) \sin 2\varphi d\varphi, \quad (5)$$

where k denotes a wave number of light in a vacuum, and $\varphi_{max}$ denotes a maximum angle of divergence in the measurement of the dependence $F_\varphi(\varphi)$ or a maximum angle of divergence at which the measured dependence $F_\varphi(\varphi)$ is significant.

11. The apparatus according to claim 10,
wherein the analyzing unit is configured to evaluate an effective cross-sectional area Aeff of the measurement-object mode by performing a calculation in accordance with Expression (6):

$$A_{\mathit{eff}} = 2\pi \frac{\left(\int_0^\infty |f_r(r)|^2 r dr\right)^2}{\int_0^\infty |f_r(r)|^4 r dr}. \quad (6)$$

12. The apparatus according to claim 10,
wherein the analyzing unit is configured to evaluate a mode field diameter MFD defined by a second moment of a near-field pattern of the measurement-object mode, the evaluation being made by performing a calculation in accordance with Expression (7):

$$MFD = 2\left[2\frac{\left(\int |f_r(r)|^2 r^3 dr\right)^2}{\int |f_r(r)|^2 r}\right]^{1/2}. \quad (7)$$

13. The apparatus according to claim 10,
wherein the analyzing unit is configured to evaluate a mode field diameter MFD defined by a second moment of a far-field pattern of the measurement-object mode, the evaluation being made by performing a calculation in accordance with Expression (8):

$$MFD = \frac{\lambda}{\pi}\left[2\frac{\int_0^{\pi/2} |F_\varphi(\varphi)|^2 \sin\varphi \cos\varphi d\varphi}{\int_0^{\pi/2} |F_\varphi(\varphi)|^2 \sin^3\varphi \cos\varphi d\varphi}\right]^{1/2}. \quad (8)$$

14. The apparatus according to claim 10,
wherein the measuring unit is configured to evaluate the dependence $F_\varphi(\varphi)$, with a light-intensity-measuring device, dependence $|F_\varphi(\varphi)|^2$ of light intensity of the measurement-object mode upon the angle of divergence φ in the far field, taking a square root of the light intensity so as to convert the dependence $|F_\varphi(\varphi)|^2$ into an absolute value $|F_\varphi(\varphi)|$ of the electric field F, and inverting a sign of the electric field F at an angle of divergence φ where the light intensity is lowest regardless of measurement noise.

15. The apparatus according to claim 10,
wherein the measuring unit is configured to selectively measure light of the measurement-object mode by selectively allowing the light to enter the measurement-object mode of the multimode optical fiber through a selective mode multiplexer.

16. The apparatus according to claim 10,
wherein the measuring unit is configured to selectively measure light of the measurement-object mode by analyzing interference between a fundamental mode and the measurement-object mode and extracting a component of the measurement-object mode.

* * * * *